United States Patent [19]

Rothstein et al.

[11] Patent Number: 5,729,100
[45] Date of Patent: Mar. 17, 1998

[54] METHOD AND APPARATUS FOR CONTROLLING BACKLASH IN MOTOR DRIVE SYSTEMS

[75] Inventors: Barry R. Rothstein, Oxnard; Bradley E. Paden, Santa Barbara, both of Calif.

[73] Assignee: The United States of America as represented by the Secretary of the Navy, Washington, D.C.

[21] Appl. No.: 790,884

[22] Filed: Feb. 3, 1997

[51] Int. Cl.⁶ ................................................. G05B 11/01
[52] U.S. Cl. ........................... 318/7; 318/630; 318/48
[58] Field of Search .............................. 318/6, 7, 45, 48, 318/98, 99, 630; 24/409, 440; 409/5

[56] References Cited

U.S. PATENT DOCUMENTS

| | | | |
|---|---|---|---|
| 3,803,935 | 4/1974 | Nozawa | 74/409 |
| 3,833,847 | 9/1974 | Kelling | 318/360 |
| 4,147,071 | 4/1979 | Scribner et al. | 74/409 |
| 4,189,959 | 2/1980 | Sawada | 74/720 |
| 4,554,842 | 11/1985 | Wood, III | 74/409 |
| 5,071,395 | 12/1991 | Fahy et al. | 475/226 |
| 5,233,247 | 8/1993 | Stark | 310/83 |

*Primary Examiner*—Brian Sircus
*Attorney, Agent, or Firm*—Melvin J. Sliwka; David S. Kalmbaugh

[57] ABSTRACT

An anti-backlash gearing system which includes first and second drive gears which mesh with a driven gear to provide torque and rotational motion to the driven gear. The drive gears are each driven by a motor, while the driven gear drives a load. The anti-backlash gearing system uses a microprocessor to control the command voltage R to each of the drive motors. The command voltage R provided to each drive motor also includes an offset $\delta$ which may be positive for one motor and negative for the other motor. The torque provided by one motor and its associated drive gear to the driven gear may be in the positive direction (clockwise direction), while the torque provided by the other motor and its associated drive gear to the driven gear is in the negative direction (counterclockwise direction). The motors are driven in opposite directions to control the backlash on the gears. As a sign change in torque is about to occur for one of the motors, there is a correction made to the torque curves for each motor so that the commanded torque for each individual motor and its associated drive gear adds up to the total commanded torque for the two motors. This substantially reduces backlash and the resultant impact loading on the gear teeth of the drive gears and the driven gear of the gear train.

7 Claims, 7 Drawing Sheets

METHOD AND APPARATUS FOR CONTROLLING BACKLASH IN MOTOR DRIVE SYSTEMS

BACKGROUND OF THE INVENTION

1. Field of the Invention

The present invention relates generally to motor drive systems. More specifically, the present invention relates to a gearing system adapted for use with a motor drive which is capable of eliminating the effect of backlash while effecting smooth engagement between mating gears.

2. Description of the Prior Art

Backlash refers generally to the lost motion between two intermeshed gears due to imperfect meshing of the gear teeth. Backlash is therefore the amount a drive gear must move before it transmits its motion to the gear driven. In certain practical situations, the existence of backlash in a gear train transmitting power or motion cannot be tolerated.

For example, in an electronic timepiece, electrical timing pulses are generated which serve to actuate a stepping motor whose shaft is operatively coupled through a gear train to time-indicating hands. Should backlash occur between the drive pinion gear and the minutes wheel gear in the drive train, this permits the minute hand to float. As a consequence, the minute indication may be off by as much as one to three minutes.

Since a modern crystal-controlled electronic timepiece is inherently capable of providing highly accurate time indications, a one or two minute error by reason of mechanical backlash is not acceptable.

Similarly, in servomechanisms and in variable speed and other type drive mechanisms in which motion is transmitted through gears, the existence of backlash is often objectionable. For example, in radar tracking systems which utilize a motor drive system having a drive train which includes multiple gears, backlash which occurs between mating gears may seriously impede the ability of the radar to accurately track an incoming aircraft, target or the like.

Figures 1A, 1B, 1C:
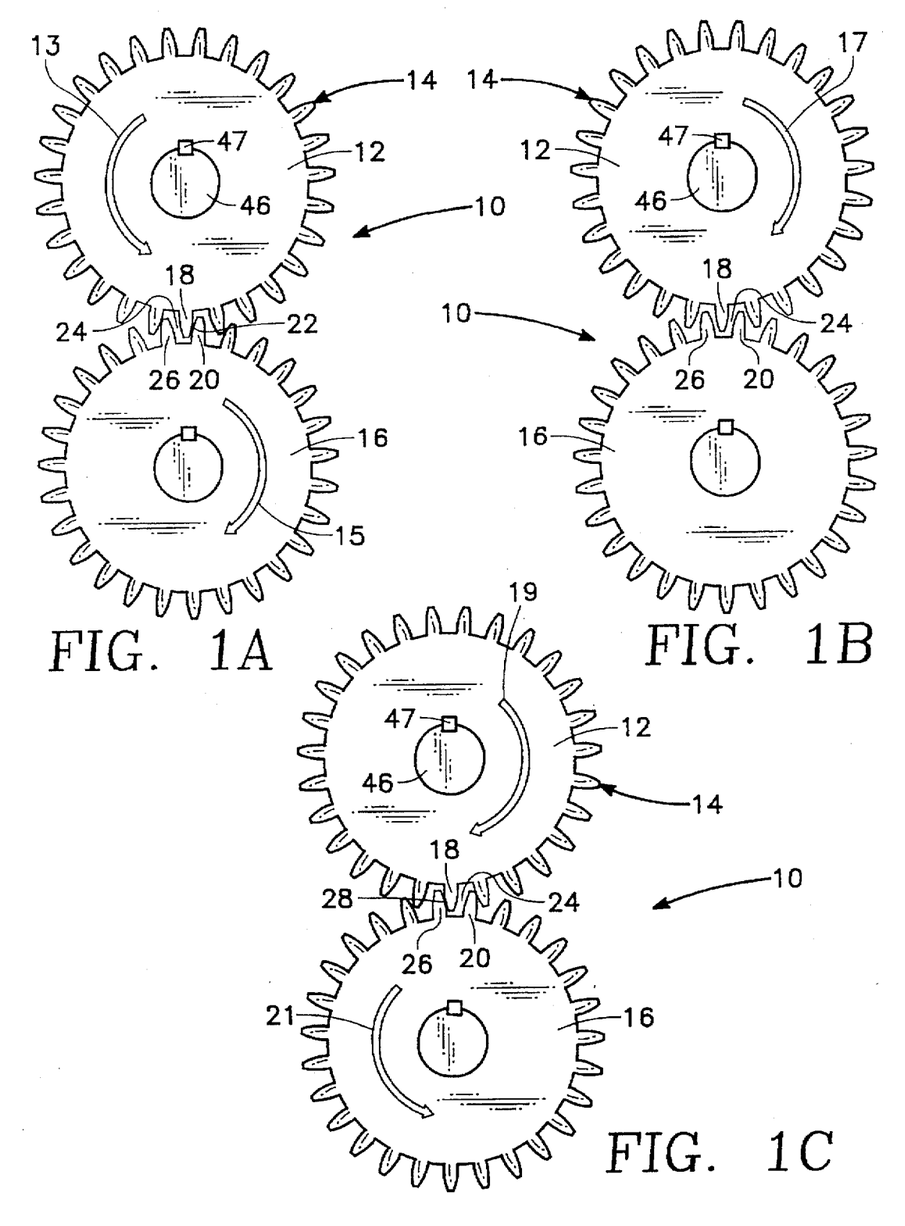
FIG. 1 is schematic drawing illustrating a gear transmission which is subject to backlash whenever the drive gear changes direction.

Referring to FIGS. 1A–1C, there is shown a drive system or train, designated generally by the reference numeral 10 which includes a drive gear 12 attached to the shaft 46 of a motor (not illustrated) by a key 47. There is also shown a driven gear 16 which engages drive gear 12 such that drive gear 12, which rotates in the counterclockwise direction as indicated by arrow 18, drives or rotates gear 16 in the clockwise direction as indicated by arrow 15.

In FIG. 1B the direction of drive gear 12 is reversed, as indicated by arrow 17, resulting in an imperfect meshing of the gear teeth between gear 12 and gear 16. For example, in FIG. 1A tooth 18 of gear 12 engages tooth 20 of gear 16 at a point of contact 22 transmitting torque and thus rotary motion from gear 12 to gear 16. With the change of direction of gear 12 shown in FIG. 1B, tooth 18 of gear 12 will not engage any of the teeth of gear 16, that is there is a gap 24 between tooth 18 of gear 12 and tooth 20 of gear 16.

As is best illustrated in FIG. 1C, a minimal time period after gear 12 changes direction tooth 18 of gear 12 collides with 26 of gear 16 at a point of contact 28. This collision results in a significant impact force of the gear teeth of gears 12 and 16 which, in turn, generates noise and contributes significantly to the fatigue of the material from which gears 12 and 16 are made. In addition, gears 12 and 16 (as illustrated in FIG. 1B) are momentarily out of contact which impacts the positioning accuracy achievable with gear transmission systems of the type illustrated in FIGS. 1A–1C.

Figure 2A:
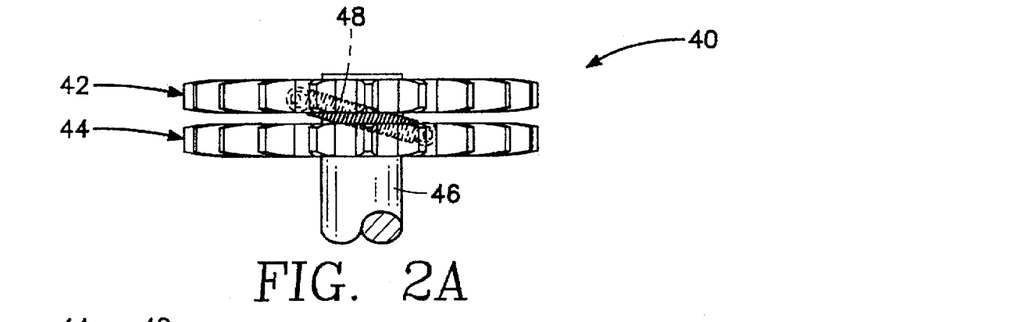
FIG. 2 is a schematic diagram illustrating an anti-backlash system which is used to reduce the effects of backlash whenever the driven gear is subject to a minimal load.
Figures 2B, 2C:
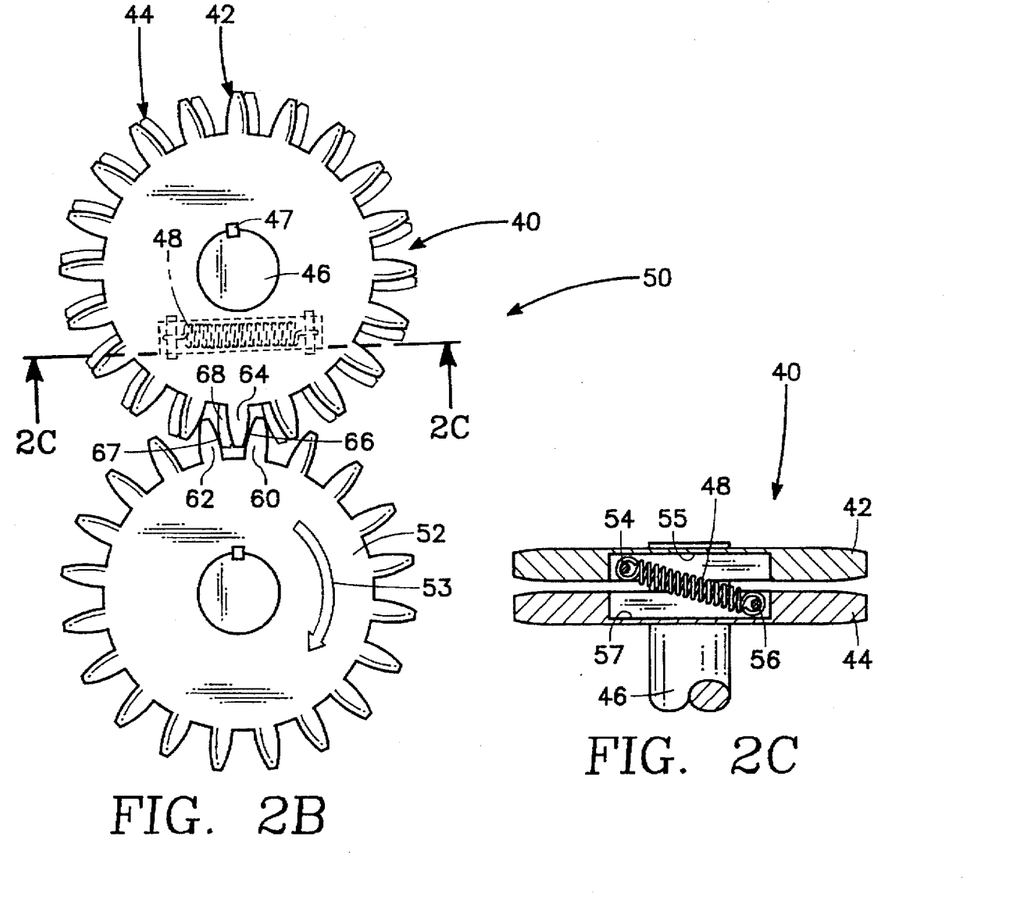

Referring to FIGS. 2A–2C, anti-backlash systems 40 of the type illustrated in FIGS. 2A–2C have been used in the past to reduce the effects of backlash in gear transmission systems. A pair of drive gears 42 and 44 are stacked on the drive shaft 46 of a motor (not illustrated) in the manner depicted in FIG. 2A. A key 47 is then used to secure the drive gear 42 to drive shaft 46. Drive gear 44 is positioned solely by the spring 48 is otherwise free to rotate on shaft 46.

The anti-backlash system 40 of FIG. 2A also includes a spring 48 which has one end of thereof affixed to a rod 54 positioned within a rectangular shaped recess 55 in gear 42. The opposite end of spring 48 is affixed to a rod 56 positioned within a rectangular shaped recess 57 in gear 44. Spring 48, which is under tension, "pinches" the teeth of driven gear 52 between an associated pair of teeth from drive gears 42 and 44. For example, tooth 64 of gear 42 is one of the two teeth of stacked gears 42 and 44 which pinch tooth 60 of driven gear 52, while tooth 68 of gear 44 is one of the two teeth of stacked gears 42 and 44 which pinch tooth 62 of driven gear 52. Provided that the drive force exerted by drive gears 42 and 44 does not exceed the compression force exerted by spring 48 at the drive tooth contact points 66 and 67, backlash is avoided.

Although anti-backlash system 40 is a somewhat effective system which is low cost, the spring force always exceed the drive force which contributes significantly to wear and tear on the gears 42, 44 and 52 of anti-backlash system 40.

In addition, while the anti-backlash system of FIGS. 2A–2C is adequate for low load systems, there is a need for a more effective anti-backlash system which will significantly reduce backlash when the loads placed on the driven gear are greatly increased such as in a radar tracking system.

It is, therefore, an object of the present invention to provide an improved anti-backlash gearing system which provides that the drive and driven gears are not subject to excessive wear.

It is another object of the present invention to provide an improved anti-backlash gearing system which is capable of eliminating objectional noises between gear changes.

It is still another object of the present invention to provide an improved anti-backlash gearing system which is adapted to retain approximately zero backlash of the mating gears whenever the drive gear changes direction.

The above and other novel features and advantages of the present invention and the manner of realizing them will become more apparent and the invention will be best understood from a study of the following description and appended claims, with reference to the attached drawings.

SUMMARY OF THE INVENTION

According to the present invention, briefly stated, there is provided an anti-backlash gearing system which includes first and second drive gears which mesh with a driven gear to provide torque and thus rotational motion to the driven gear. The drive gears are each driven by a motor, while the driven gear drives a load, such as a tracking radar, in either the clockwise or counterclockwise direction.

The anti-backlash gearing system uses a microprocessor or the like to control the command voltage R to each of the drive motors. The command voltage R provided to each drive motor also includes an offset δ which may be positive for one motor and negative for the other motor.

In the anti-backlash system of the present invention the torque provided by one motor and its associated drive gear to the driven gear may be in the positive direction (clockwise direction), while the torque provided by the other motor and its associated drive gear to the driven gear is in the negative direction (counterclockwise direction). The motors are driven in opposite directions to control the backlash on the gears.

As a sign change in torque is about to occur for one of the motors, there is a correction made to the torque as defined by the torque curves for each motor so that the commanded torque for each individual motor and its associated drive gear adds up to the total commanded torque for the two motors. This, in turn substantially reduces backlash and the resultant impact loading on the gear teeth of the drive gears and the driven gear of the gear train.

DETAILED DESCRIPTION OF THE PREFERRED EMBODIMENT

Figure 3:
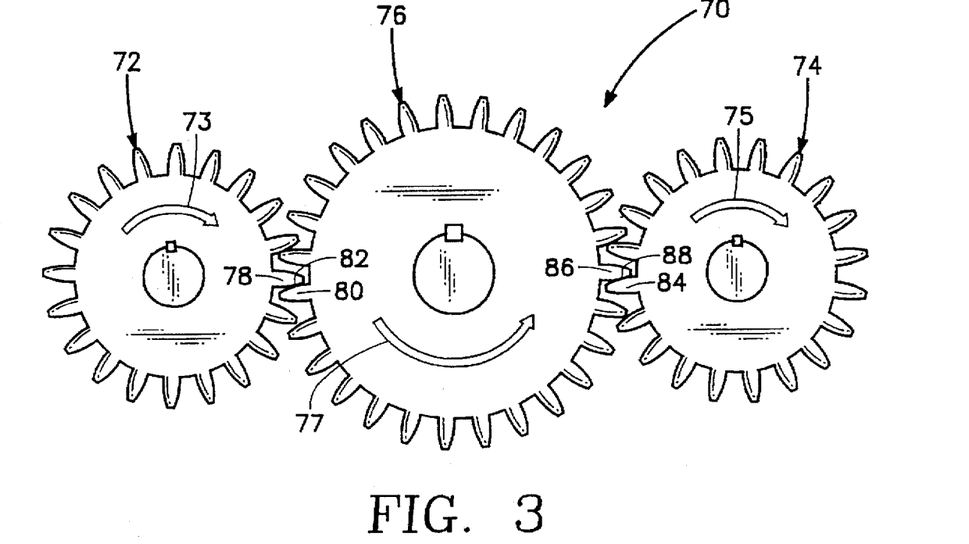
FIG. 3 illustrates a simplified gear drive system utilizing a pair of motors and their associated drive gears to transmit torque to a driven gear.

Referring to FIG. 3, there is shown a dual gear drive system, designated generally by the reference numeral 70 which comprises a pair of drive gears 72 and 74 and a driven gear 76. Driven gear 76 has gear teeth which mesh the gear teeth of the drive gears 72 and 74. The drive gears 72 and 74 are coupled to a pair of motors (not illustrated) which transmit rotary motion to the gears 72 and 74 in either the clockwise direction (as indicated by arrows 73 and 75) or the counterclockwise direction.

Figure 4:
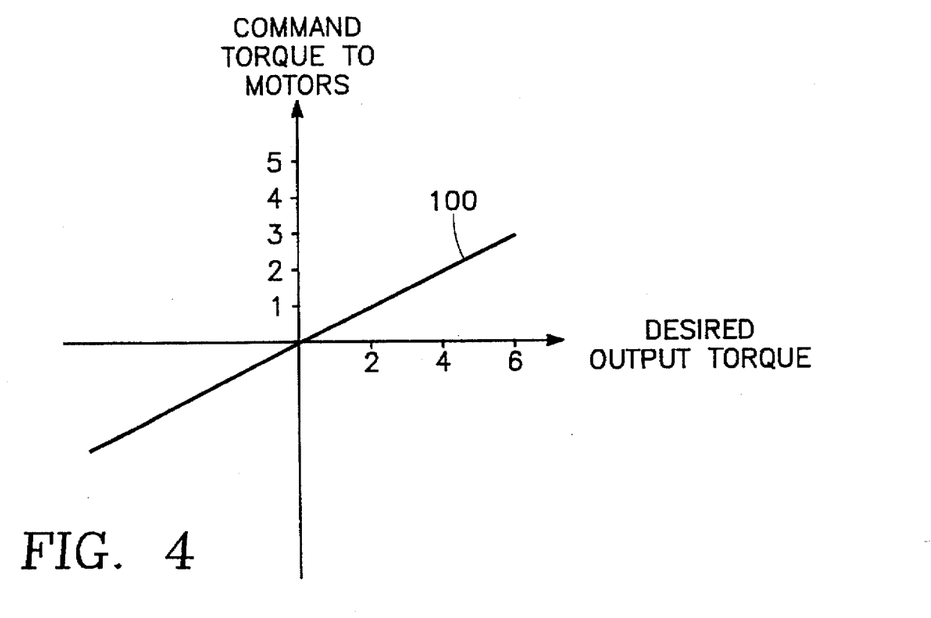
FIG. 4 is an ideal curve illustrating the torque transmitted to the driven gear of FIG. 3 by the drive gears of FIG. 3.

When drive gear 72 is rotating in the clockwise direction, as indicated by arrow 73, gear tooth 78 of drive gear 72 engages gear tooth 80 of driven gear 76 at a contact point 82. Simultaneously, drive gear 74, which is also rotating in the clockwise direction, has its gear tooth 84 engaging gear tooth 86 of driven gear 76 at a contact point 88. The results is an output torque for the driven gear 76 that is twice the torque of the motors driving gears 72 and 74 as depicted in FIG. 4. For example, when the command torque of each motor is two the output torque from driven gear 76 is four times the gear ratio. The gear ratio for the driven gear/drive gear of FIG. 3 is 27/20, that is driven gear 76 has 27 gear teeth and drive gears 72 and 74 each have 20 gear teeth. When the command torque is three the output torque from driven gear 76 is six times the gear ratio. However, when the sign of the torque changes, that is line 100 passes through zero to a negative number on the Y axis of the graph of FIG. 3, backlash will occur.

Figure 5A:
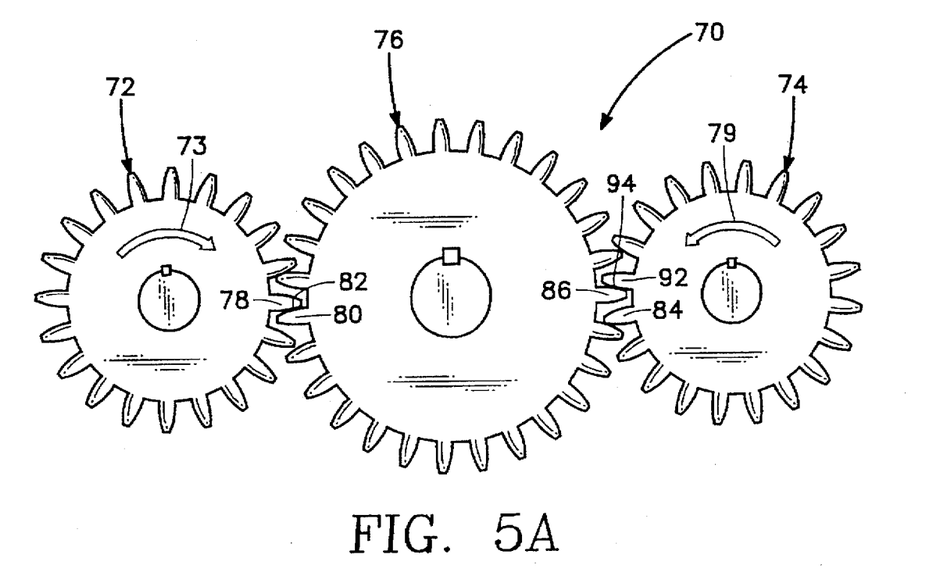
FIG. 5A illustrates a dual gear drive system wherein differential torques are applied to the drive motors and their associated drive gears causing one of the drive gears to rotate in direction opposite the other drive gear.
Figure 5B:
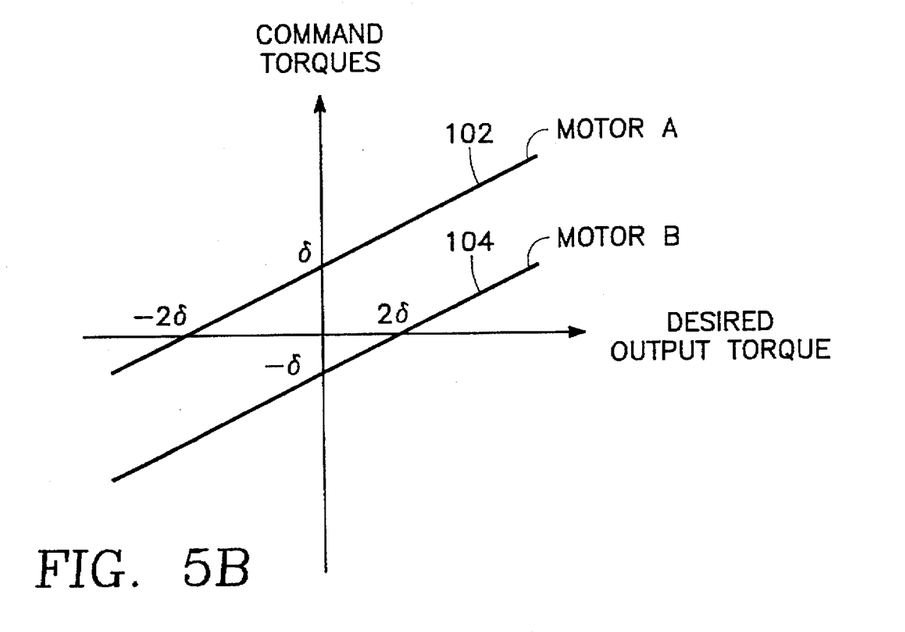
FIG. 5B is a plot of the differential torques applied to the motors of FIG. 5A and their associated drive gears.

Referring to FIG. 5A, there is shown a two motor drive system and their associated drive gears 72 and 74 which is identical to the system of FIG. 4 except that a differential torque is applied to the motors, which are designated in FIG. 5B as motors A and B. Motor A drives gear 72, while motor B drives gear 74.

As shown in FIGS. 5A and 5B a positive bias torque is applied to motor A which results in a clockwise direction of rotation for gear 72 as indicated by arrow 73 and a negative bias torque bias torque is applied to motor B which results in a counterclockwise direction of rotation for gear 74. As long as the total drive torque for motors A and B is less than the bias torque, backlash does not occur.

As shown in FIG. 5A gear tooth 78 of gear 72 engages gear tooth 80 of gear 76 at a contact point 82 resulting in counterclockwise rotation of driven gear 76 without backlash as long as motor B has a negative bias applied thereto.

Figure 6:
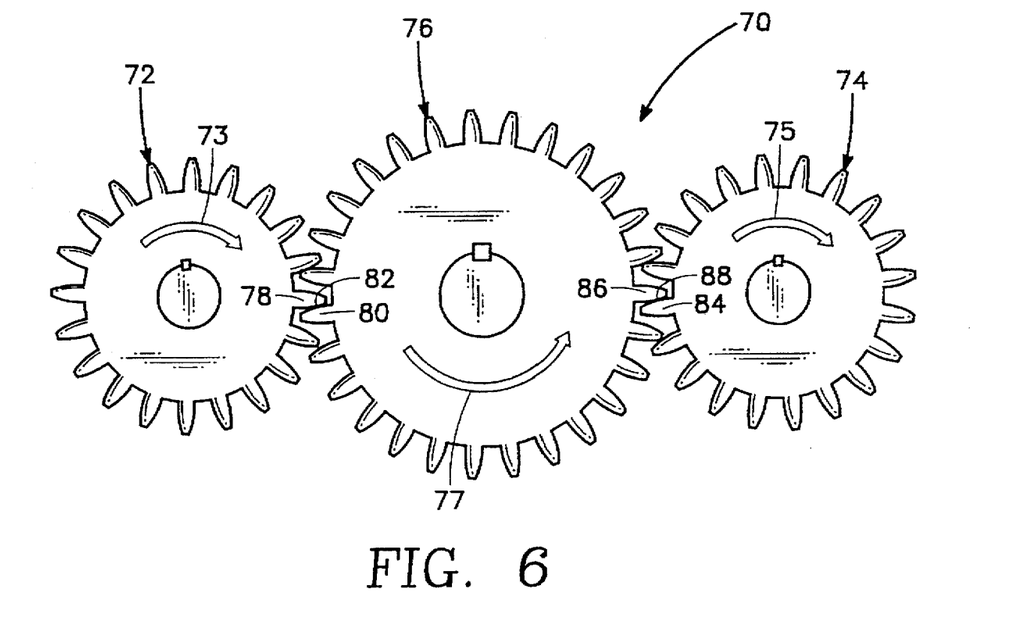
FIG. 6 illustrates the dual drive gear system of FIG. 5A wherein the command torque exceeds the bias torque in the positive direction resulting in backlash and a change of direction of the rotation of one motor such that both motors are now rotating in the same direction.

However, as shown by FIGS. 5A and 6, when the command torque (FIG. 5B) exceeds the bias torque in the positive direction, backlash occurs when motor B and thus drive gear 74 changes direction of rotation from clockwise (as indicated by arrow 79, FIG. 5A) to counterclockwise (as indicated by arrow 75, FIG. 6).

In FIG. 5A, tooth 92 of drive gear 74 engages tooth 86 of driven gear 76. However, when drive gear 74 changes direction as shown in FIG. 5B, tooth 84 of drive gear 74 will now engage tooth 86 of driven gear 76 resulting in backlash.

Thus, in the dual gear drive system 70 illustrated in FIGS. 5A and 6, whenever the drive torque exceeds the bias torque in either the positive direction or the negative direction there will be undesirable impact loading on the gear teeth of gears 72 and 76 or gears 74 and 76.

It should be noted that the command torques versus output torque plot of FIG. 5B includes a constant offset δ which results in opposing directional rotation of motors A and B and thus drive gears 72 and 74 between 2δ and −2δ on the output torque axis of FIG. 5B. For motors A and B to generate the differential torques illustrated by FIG. 5B, the input voltages shown in TABLE I with an offset δ=2 volts are applied to motor A and motor B.

TABLE I

| Input (volts) | R + δ (Motor A) | R − δ (Motor B) | NET |
|---|---|---|---|
| 0 | 2 | −2 | 0 |
| 1 | 3 | −1 | 2 |
| −1 | 1 | −3 | −2 |
| 2 | 4 | 0 | 4 |
| −2 | 0 | −4 | −4 |
| 3 | 5 | 1 | 6 |
| −3 | −1 | −5 | −6 |
| 4 | 6 | 2 | 8 |
| −4 | −2 | −6 | −8 |

Referring to TABLE I whenever R (input voltage) is greater than the offset voltage δ, the voltage R+δ supplied to motor A and the voltage R−δ supplied to Motor B will be of like sign resulting in drive gears 72 and 74 having rotational motion in the same direction. When the voltages R+δ and R−δ have an opposite sign, the direction of rotation of one gear 72 or 74 is opposite the direction of rotation of the other drive gear 72 or 74.

Figure 7:
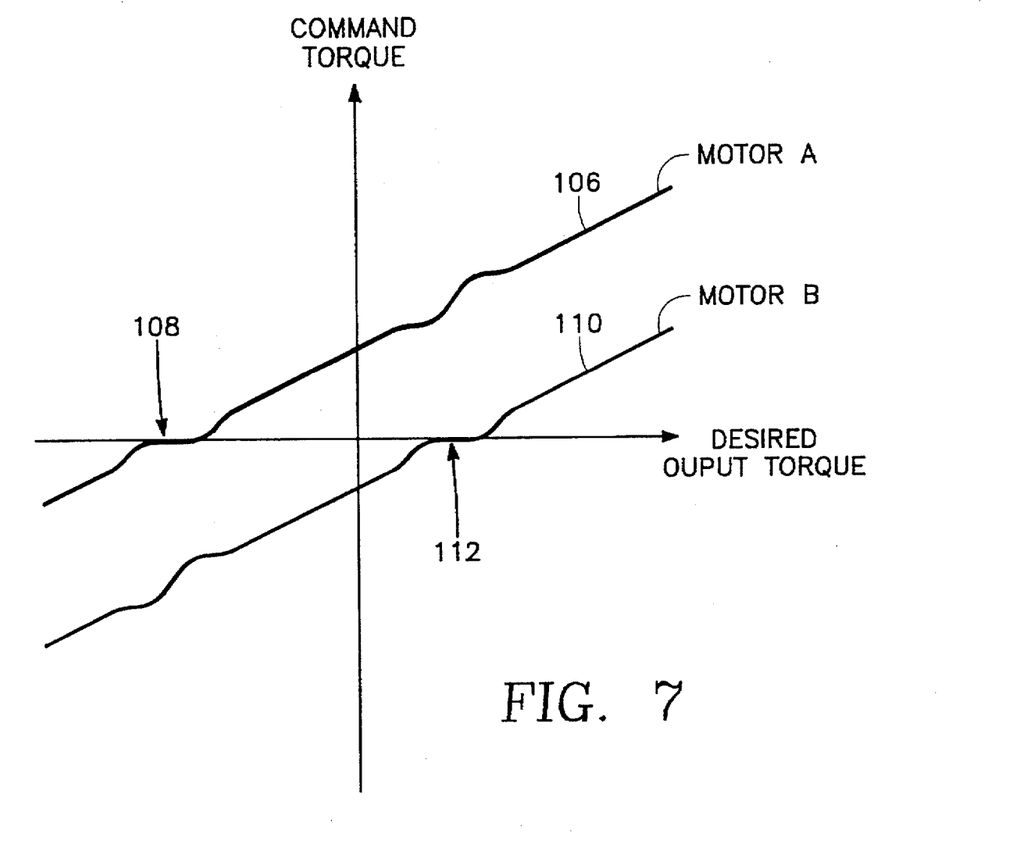
FIG. 7 illustrates an ideal plot of the torque applied to each of the motors and their associated drive gears of FIG. 5A which avoids backlash whenever a sign change in torque occurs.
Figure 8:
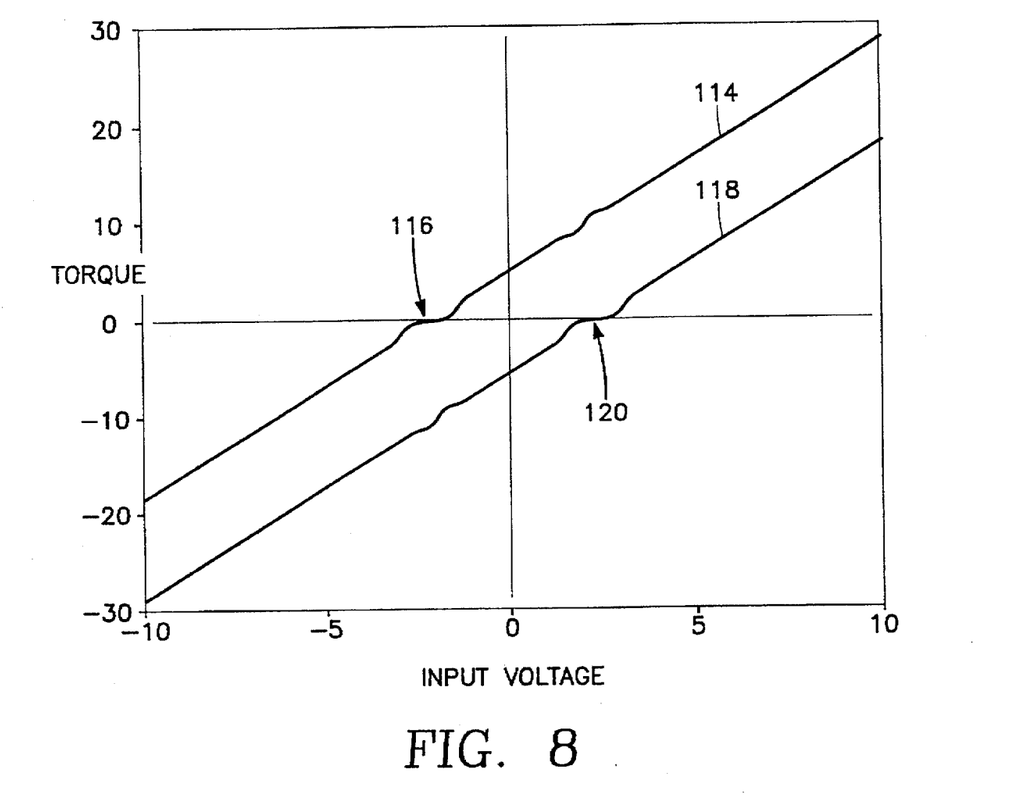
FIG. 8 illustrates a plot of input voltage versus torque for the dual drive system of FIG. 5A which backlash whenever a sign change in torque occurs.

Through the use of offset command torques δ as shown in FIG. 5B the two drive gears 72 and 74 do not undergo backlash at smaller torques and at larger torques will experience backlash only one gear 72 or 74 at a time at the desired output torques which are +2δ and −2δ (illustrated in FIG. 5B). To achieve the objective of reducing gear impact and wear, and to generally smooth motion in the gear train 70, it is desirable to reduce the torque on the drive gears 72 and 74 in the backlash region where one of the motor torques changes sign. This is accomplished by reducing the gain or slope of the individual command torque curves 102 and 104 (FIG. 5B) in the region near zero torque. The reduced gain on one drive motor is compensated for by increasing the gain on the other drive motor in an equal amount with an opposite slope as is best illustrated in FIGS. 7 and 8. Using the command technique of FIG. 7, gears 72 and 74 gear movement through backlash is slower resulting in impact with less energy between mating gears, but with the net torque delivered to the driven gear 76 remaining constant. The combined slope reduction and compensation illustrated in FIGS. 7 and 8 is referred to as "backlash softening" or "backlash minimization".

Referring to FIGS. 5B, 6 and 7, the command torque-output torque plot for motors A and B of FIG. 5B is reshaped in FIG. 7 to minimize the impact loading on the gear teeth of drive gears 72 and 74 as well as driven gear 76 whenever the drive torque exceeds the bias torque in either the positive of the negative direction. This, in turn, will significantly reduce the wear and general damage to the gear teeth of gears 72, 72 and 74 as well as significantly reduce the position inaccuracies and other deficiencies associated with backlash in gear drive system of the type depicted in FIG. 6.

When a sign change in torque is about to occur for either motor A or motor B, the rate of torque change is reduced to minimize impact loading on gear teeth during backlash. For example, the slope of the torque curve 106 for motor A is reduced in a region designated generally by the reference numeral 112 which is just prior to the sign change in torque for motor B. Simultaneously, the slope of the torque curve 110 for motor B is increased so that the commanded torque for each motor A and B adds up to the total commanded torque. As depicted in FIG. 7, at the sign change in torque for motor B there is an increase in the slope of the torque curve 106 for motor A and a simultaneous decrease in the slope of the torque curve 110 for motor B.

In a like manner, the slope of torque curve 110 for motor B is reduced in a region designated generally by the reference numeral 108 which is just prior to the sign change in torque for motor A. Simultaneously, the slope of the torque curve for motor A is increased so that the command torque for each motor A and B again adds up to the total commanded torque. As depicted in FIG. 7, at the sign change in torque for motor A there is an increase in the slope of the torque curve 110 for motor B and a simultaneous decrease in the slope of the torque curve 106 for motor A.

Referring to FIGS. 6 and 8, the input voltage versus torque plot illustrated in FIG. 8 is derived using the following equations.

$$\text{Motor } A \text{ Torque} = 2.4[(X-2)-(X-2)e^{-(X-2)^2}] + 2.4(X+2)e^{-(X+2)^2} \quad (1)$$

where X in equation one is an input voltage which will result in the torque curve 114 for motor A when equation one is processed by a computer or other data processing apparatus which is capable of performing mathematical operations.

$$\text{Motor } B \text{ Torque} = 2.4[(X+2)-(X+2)e^{-(X+2)^2}] + 2.4(X-2)e^{-(X-2)^2} \quad (2)$$

where X in equation two is an input voltage which will result in the torque curve 118 for motor B when equation two is processed by a computer or other data processing apparatus which is capable of performing mathematical operations.

It should be understood by those skilled in the art that additional equations may be derived which have the same general characteristics as equations (1) and (2) and which will eliminate backlash and allow smooth engagement of mating gears in gear train 70.

The following is the computer software program listing for equations one and two where data 1 is the motor A torque and data 2 is the motor B torque.

```
data1=2.4 * ((x−2)+(−1*(x−2)) .* exp(−(x−2)**2))−2.4 * ((−1*(x+
    2) .* exp(−(x+2)**2));

data2=2.4 * ((x+2)+(−1*(x+2)) .* exp(−(x+2)**2))−2.4 * ((−1*(x−
    2) .* exp(−(x−2)**2));
```

From the foregoing description, it may readily be seen that the present invention comprises a new, unique and exceedingly useful dual drive gear system for eliminating backlash which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A method for substantially eliminating backlash from a gear train having first and second drive gears which engage a driven gear, each of said first and second drive gears and said driven gear having a plurality of gear teeth, said method comprising the steps of:

calculating a first motor torque, responsive to an input voltage, and providing a first electrical signal representative thereof, said first motor torque having a first constant slope torque curve with respect to said input voltage;

calculating a second motor torque, responsive to said input voltage, and providing a second electrical signal representative thereof, said second motor torque having a second constant slope torque curve with respect to said input voltage, said first constant voltage torque curve being offset from said second constant slope torque curve by an offset voltage δ;

actuating a first motor, responsive to said first electrical signal, said first motor being coupled to said first drive gear to transmit said first motor torque through said first drive gear to said driven gear;

actuating a second motor, responsive to said second electrical signal, said second motor being coupled to said second drive gear to transmit said second motor torque through said second drive gear to said driven gear, said backlash minimization improving motion of said first and second drive gears whenever one of said first and second motor torques changes a sign;

reshaping said first and second constant slope torque curves whenever one of said first and second constant slope torque curves changes a sign by increasing and then decreasing the slope of one of said first and second constant slope torque curves while simultaneously decreasing and then increasing the slope of the other of said first and second constant slope torque curves to minimize impact loading on the gear teeth of said first and second drive gears and the gear teeth of said driven gear.

2. The method of claim 1 wherein said offset voltage is about two volts.

3. A method for substantially eliminating backlash from a gear train having first and second drive gears which engage a driven gear, each of said first and second drive gears and said driven gear having a plurality of gear teeth, said method comprising the steps of:

calculating a first motor torque, responsive to an input voltage X and providing a first electrical signal representative thereof, said first motor torque having a first constant slope torque curve with respect to said input voltage X;

said first motor torque being calculated in accordance with the following expression:

$$\text{First Motor Torque} = 2.4[(X-2)-(X-2)e^{-(X-2)^2}] + 2.4(X+2)e^{-(X+2)^2}$$

calculating a second motor torque, responsive to said input voltage X, and providing a second electrical signal representative thereof, said second motor torque having a second constant slope torque curve with respect to said input voltage X, said first constant voltage torque curve being offset from said second constant slope torque curve by an offset voltage $\delta$;

said second motor torque being calculated in accordance with the following expression:

$$\text{Second Motor Torque} = 2.4[(X+2)-(X+2)e^{-(X+2)^2}] + 2.4(X-2)e^{-(X-2)^2}$$

actuating a first motor, responsive to said first electrical signal, said first motor being coupled to said first drive gear to transmit said first motor torque through said first drive gear to said driven gear;

actuating a second motor, responsive to said second electrical signal, said second motor being coupled to said second drive gear to transmit said second motor torque through said second drive gear to said driven gear;

reshaping said first and second constant slope torque curves whenever one of said first and second constant slope torque curves changes a sign by increasing and then decreasing the slope of one of said first and second constant slope torque curves while simultaneously decreasing and then increasing the slope of the other of said first and second constant slope torque curves to minimize impact loading on the gear teeth of said first and second drive gears and the gear teeth of said driven gear.

4. The method of claim 3 wherein said offset voltage is about two volts.

5. An anti-backlash gearing system comprising:

a first drive gear having a plurality of gear teeth;

a first motor having a drive shaft coupled to said first drive gear;

a second drive gear having a plurality of gear teeth;

a second motor having a drive shaft coupled to said second drive gear;

a driven gear having a plurality of gear teeth, the gear teeth of said first and second drive gears engaging the gear teeth of said driven gear;

said first motor transmitting a first motor torque to said driven gear through said first drive gear, said second motor transmitting a second motor torque to said driven gear through said second drive gear, said first motor torque and said second motor torque causing a rotational movement of said driven gear;

said first motor torque and said second motor torque substantially eliminating backlash between said driven gear and said first and second drive gears whenever a sign change occurs in one of said first and second motor torques; and computing means for calculating said first motor torque and said second motor torque and for generating electrical signals representative thereof, said computing means calculating said first motor torque and said second motor torque from an input voltage X in accordance with the expressions:

$$\text{First Motor Torque} = 2.4[(X-2)-(X-2)e^{-(X-2)^2}] + 2.4(X+2)e^{-(X+2)^2}$$

and $$\text{Second Motor Torque} = 2.4[(X+2)-(X+2)e^{-(X+2)^2}] + 2.4(X-2)e^{-(X-2)^2}$$

said computing means supplying said electrical signals to said first motor and said second motor, said first motor, responsive to said electrical signals, transmitting said first motor torque to said driven gear through said first drive gear and said second motor, responsive to said electrical signals, transmitting said second motor torque to said driven gear through said second drive gear.

6. The anti-backlash gearing system of claim 5 wherein the rotational movement of said driven gear changes from a first direction of rotation to a second direction of rotation, said first direction of rotation being a clockwise direction of rotation and said second direction of rotation being a counter-clockwise direction of rotation.

7. The anti-backlash gearing system of claim 5 wherein the rotational movement of said driven gear changes from a first direction of rotation to a second direction of rotation, said first direction of rotation being a counterclockwise direction of rotation and said second direction of rotation being a clockwise direction of rotation.

* * * * *